United States Patent
Sharma et al.

(10) Patent No.: US 6,539,352 B1
(45) Date of Patent: *Mar. 25, 2003

(54) SUBWORD-BASED SPEAKER VERIFICATION WITH MULTIPLE-CLASSIFIER SCORE FUSION WEIGHT AND THRESHOLD ADAPTATION

(76) Inventors: Manish Sharma, 1 JFK Blvd., Apt. 37A, Sommerset, NJ (US) 08873; Xiaoyu Zhang, 371 Hoes La., Suite 203, Piscataway, NJ (US) 08854; Richard J. Mammone, 182 Beaumont Way, Bridgewater, NJ (US) 08807

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 264 days.

(21) Appl. No.: 08/976,280

(22) Filed: Nov. 21, 1997

Related U.S. Application Data

(60) Provisional application No. 60/031,639, filed on Nov. 22, 1996.
(51) Int. Cl.[7] ............................................. G10L 17/00
(52) U.S. Cl. ....................................... 704/249; 704/250
(58) Field of Search ................................ 704/249, 250, 704/273

(56) References Cited

U.S. PATENT DOCUMENTS

| | | | | |
|---|---|---|---|---|
| 4,283,601 A | * | 8/1981 | Nakajima ................... | 704/233 |
| 5,548,647 A | * | 8/1996 | Naik et al. .................. | 704/200 |
| 5,596,679 A | * | 1/1997 | Wang ......................... | 704/236 |
| 5,638,486 A | * | 6/1997 | Wang et al. ................ | 704/236 |

OTHER PUBLICATIONS

Kevin R. Farrell and Richard J. Mammone, "Data Fusion Techniques for Speaker Recognition," in Modern Methods of Speech Processing, ed. by Ravi P. Ramachandran and Richard J. Mammone, Kluwer Academic Publishers, p. 279–297, Sep. 1995.*

Manish Sharma and Richard J. Mammone, "Subword-Based Text-Dependent Speaker Verification System with User-Selectable Passwords," Proc. IEEE ICASSP 96, p. 93–96, May 1996.*

Richard J. Mammone, Xiaoyu Zhan, and Ravi P. Ramachandran, "Robust Speaker Recognition," IEEE Signal Processing Magazine, p. 58–71, Sep. 1996.*

* cited by examiner

Primary Examiner—Tālivaldis Ivars Šmits
(74) Attorney, Agent, or Firm—Thomas H. Young, Esq.; Merchant & Gould P.C.

(57) ABSTRACT

The voice print system of the present invention is a subword-based, text-dependent automatic speaker verification system that embodies the capability of user-selectable passwords with no constraints on the choice of vocabulary words or the language. Automatic blind speech segmentation allows speech to be segmented into subword units without any linguistic knowledge of the password. Subword modeling is performed using a multiple classifiers. The system also takes advantage of such concepts as multiple classifier fusion and data resampling to successfully boost the performance. Key word/key phrase spotting is used to optimally locate the password phrase. Numerous adaptation techniques increase the flexibility of the base system, and include: channel adaptation, fusion adaptation, model adaptation and threshold adaptation.

5 Claims, 13 Drawing Sheets

Estimate The Channel By Generating A Filter

```
Set α = pole bandwidth threshold                    — 42 for every frame of speech

Evaluate the roots z_i of the linear prediction (LP) polynomial
    if abs(z_i) > α set abs(z_i) = α
        modify zi to Z_i, given by Z_i = α ∠z_i else

Z_i = z_i end if
                                    P
    Evaluate LPCC using z_i  by c(n) = Σ z_i^n        P = # of LP poles
                                   i=1                n = 1...N. N is the cepstral
                            ^       P                 order, normally 12
    Evaluate PFCC using Z_i  by ĉ(n) = Σ Z_i^n
                                   i=1
    end for                                           — 44
```

```
compute mean (average) of PFCC vectors to obtain channel estimate filter
The filter is a representation of a LPC filter in the cepstral domain
```
— 46

```
save the cannel estimate filter as part of the
voice print in the voice print database.
```
— 48

FIG. 1B

SUBWORD-BASED SPEAKER VERIFICATION WITH MULTIPLE-CLASSIFIER SCORE FUSION WEIGHT AND THRESHOLD ADAPTATION

CROSS REFERENCE TO RELATED APPLICATIONS

This application claims priority from Provisional Application No. 60/031,639, filed Nov. 22, 1996, entitled Voice Print System.

BACKGROUND OF THE INVENTION

The invention directed to an automatic speaker verification (ASV) system and method useful for storing and processing voice signals to automatically ascertain the identity of an individual.

1. Field of The Invention

The invention relates to the fields of digital speech processing and speaker recognition.

2. Description of Related Art

In many situations it is desired to verify the identity of a person, such as a consumer. For example, in credit card transactions, it is important to confirm that a consumer presenting a credit card (or credit card number) to a merchant is authorized to use the credit card. Currently, the identity of the consumer is manually verified by the merchant. The back of the credit card contains a signature strip, which the consumer signs upon credit card issuance. The actual signature of the consumer at the time of sale is compared to the signature on the back of the credit card by the merchant. If in the merchant's judgement, the signatures match, the transaction is allowed to proceed.

Another systems of the prior art includes placing a photograph of an authorized user on the credit card. At the time of the transaction, the merchant compares the photograph on the card with the face of the person presenting the card. If there appears to be a match, the transaction is allowed to proceed.

However, these prior art methods have serious drawbacks. These systems are manual and consequently prone to human error. Signatures are relatively easy to forge and differences between signatures and photographs may go unnoticed by inattentive merchants. Further, these systems cannot be used with credit card transactions which do not occur in person, for example, transactions which occur via telephone.

Voice verification systems, sometimes known as automatic speaker verification (ASV) systems, attempt to cure the deficiencies of these prior art methods. These systems attempt to match the voice of the person whose identity is undergoing verification with a known voice.

One type of voice recognition system is a text-dependent automatic speaker verification system. The text-dependent ASV system requires that the user speak a specific password or phrase (the "password"). This password is determined by the system or by the user during enrollment. However, in most text-dependent ASV systems, the password is constrained to be within a fixed vocabulary, such as a limited number of numerical digits. The limited number of password phrases gives an imposter a higher probability of discovering a person's password, reducing the reliability of the system.

Other text-independent ASV systems of the prior art utilize a user-selectable password. In such systems, the user enjoys the freedom to make-up his/her own password with no constraints on vocabulary words or language. The disadvantage of these types of systems is that they increase the processing requirement of the system because it is much more technically challenging to model and verify a voice pattern of an unknown transcript (i.e. a highly variable context).

Modeling of speech has been done at the phrase, word, and subword level. In recent years, several subword-based speaker verification systems have been proposed using either Hidden Markov Models ("HMM") or Artificial Neural Network ("ANN") references. Modeling at the subword level expands the versatility of the system. Moreover, it is also conjectured that the variations in speaking styles among different speakers can be better captured by modeling at the subword level.

Another challenge posed under real-life operating environments is that noise and background speech/music may be detected and considered as part of the password. Other problems with transmission or communications systems is that channel-specific distortion occurs over channels, such as transducers, telephone lines and telephone equipment which connect users to the system. Further, ASV systems using modeling need to adapt to changes in the user and to prior successful and unsuccessful attempts at verification.

What is needed are reliable systems and methods for automatic speaker verification of user selectable phrases.

What is needed is a user-selectable ASV system in which accuracy is improved over prior ASV systems.

What is needed is a word or phrase detector which can identify key portions of spoken password phrases over background noise.

What is needed is channel adaptation to adapt a system in response to signals received over different channels.

What is needed is fusion adaptation to adapt a system in response to previous errors and successes.

What is needed is threshold adaptation to adapt a system in response to previous errors and successes.

What is needed is model adaptation to adapt underlying a system model components in response to previous successes.

SUMMARY OF THE INVENTION

The voice print system of the present invention builds and improves upon existing ASV systems. The voice print system of the present invention is a subword-based, text-dependent automatic speaker verification system that embodies the capability of user-selectable passwords with no constraints on the choice of vocabulary words or the language. Automatic blind speech segmentation allows speech to be segmented into subword units without any linguistic knowledge of the password. Subword modeling is performed using a discriminant training-based classifier, namely a Neural Tree Network (NTN). The present NTN is a hierarchical classifier that combines the properties of decision trees and feed-forward neural networks. The system also takes advantage of such concepts as multiple classifier fusion and data resampling to successfully boost performance.

Key word/key phrase spotting is used to optimally locate the password. Channel adaptation removes the nonuniform effects of different environments which lead to varying channel characteristics, such as distortion. Channel adaptation is able to remove the characteristics of the test channel and/or enrollment channel to increase accuracy.

Fusion adaptation is used to dynamically change the weight accorded to the individual classifier models, which increases the flexibility of the system. Threshold adaptation dynamically alters the threshold necessary to achieve successful verification. Threshold adaptation is useful to incrementally change false-negative results. Model adaptation gives the system the capability to retrain the classifier models upon the occurrence of subsequent successful verifications.

The voice print system can be employed for user validation for telephone services such as cellular phone services and bill-to-third-party phone services. It can also be used for account validation for information system access.

All ASV systems include at least two components, an enrollment component and a testing component. The enrollment component is used to store information concerning a user's voice. This information is then compared to the voice undergoing verification (testing) by the test component. The system of the present invention includes inventive enrollment and testing components, as well as a third, "bootstrap" component. The bootstrap component is used to generate data which assists the enrollment component to model the user's voice.

1. Enrollment Summary

An enrollment component is used to characterize a known user's voice and store the characteristics in a database, so that this information is available for future comparisons. The system of the present invention utilizes an improved enrollment process. During enrollment, the user speaks the password, which is sampled by the system. Digital to analog conversion (if necessary) is conducted to obtain digital speech samples. Preprocessing is performed to remove unwanted silence and noise from the voice sample, and to indicate portions of the voice sample which correspond to the user's voice.

Next, the transmission channel carrying the user's enrollment voice signal is examined. The characteristics of the enrollment channel are estimated and stored in a database. The database may be indexed by identification information, such as by the user's name, credit card number, account identifier, etc. . .

Feature extraction is then performed to extract features of the user's voice, such as pitch, spectral frequencies, intonations, etc . . . Feature extraction may also focus, or capture, desired segments of the voice sample and reject other unwanted segments. The feature extraction process generates a number of vectors relating to features of the voice segment. Using the feature vectors, a key word/key phrase reference template may be generated and stored in a voice print database. The reference template is used during testing to locate the spoken password from extraneous speech or noise.

Next, segmentation of the voice segment occurs. Segmentation preferably occurs via automatic blind speech segmentation techniques. Alternatively, segmentation may be performed by older manual or semi-automatic techniques. Segmentation divides the voice sample into a number of subwords. The subwords are used in a modeling process.

In recent years, several subword-based speaker verification systems have been proposed. The present invention uses subword modeling and may use any of the known techniques, but preferably uses a discriminant training based classifier. The discriminant training based classifier is called a Neural Tree Network (NTN). The NTN is a hierarchical classifier that combines the properties of decision trees and feed-forward Neural Networks.

The system also utilizes the principles of multiple classifier fusion and data resampling. A multiple classifier system is a powerful solution for robust pattern classification because it allows for simultaneous use of arbitrary feature descriptors and classification procedures. The additional classifier used herein is the Gaussian Mixture Model (GMM) classifier.

In the event that only a small amount of data is available for modeling a speaker, the resulting classifier is very likely to be biased. Data resampling artificially expands the size of the sample pool and therefore improves the generalizations of the classifiers. One of the embodiments of the classifier fusion and data resampling scheme is a "leave-one-out" data resampling method.

A fusion function, which is set at a default value and stored in the database, is used to weigh the individual scored classifiers, and to set a threshold value. The threshold value is stored in the database for use in the verification process. Thus, enrollment produces a voice print database containing an index (such as the user's name or credit card number), along with enrollment channel data, classifier models, feature vectors, segmentation information, multiple trained classifier data, fusion constant, and a recognition threshold.

The threshold is used when a user is undergoing verification (or testing by the test component). A user is verified as the known user when the threshold is reached or exceeded.

2. Test Component Summary

The test component is the component which performs the verification. During testing or verification, the system first accepts "test speech" and index information from a user claiming to be the person identified by the index information. Voice data indexed in the database is retrieved and used to process the test speech sample.

During verification, the user speaks the password into the system. This "test speech" password undergoes preprocessing, as previously described, with respect to the enrollment component. The next step is to perform channel adaptation.

Channel adaptation, in a preferred embodiment, is performed by removing from the test sample the characteristics of the channel from which the test sample was received. Next, the characteristics of the enrollment channel which were stored by the enrollment component are recalled. The test sample is filtered through the recalled enrollment channel. This type of channel adaptation removes the characteristics from the test channel and supplies the characteristics from the enrollment channel to the test speech so that the test speech matches the transmission channel of the originally enrolled speech.

After channel adaption, feature extraction is performed on the test sample. This occurs as previously described with respect to the enrollment component. After feature extraction, it is desired to locate, or "spot" the phrases in the test speech and simultaneously avoid areas of background noise.

The performance of ASV systems can be significantly degraded by background noise and sounds, such as speech and music, that can lead and/or trail the user's actual spoken password. This is because small differences between the speech and the high volume noise/sounds may lead the preprocessing algorithm to incorrectly treat the background noise and sounds as part of the password. Accordingly, a sample of password including the noise and background sounds will not be recognized. To combat the effects of background noise, the invention uses a key word/key phrase spotter to identify the password phrase.

After key word/key phrase spotting, automatic speech segmentation occurs. Preferably the automatic speech segmentation is not "blind" segmentation (although "blind" segmentation could be used), but is "force" alignment segmentation. This force segmentation uses the segments previously obtained by the blind segmentation performed in the enrollment component. The test speech is therefore segmented using the segmentation information previously stored. The "force" segmentation results in the identification of subword borders. The subwords undergo multiple classifier fusion.

The multiple classifiers of the enrollment component are used to "score" the subword data, and the scores are the fused, or combined. The result of the fusion is a "final score." The final score is compared to the stored threshold. If the final score exceeds or equals the threshold, the test sample is verified as the user's. If the final score is less than the threshold, the test sample is declared not to be the user's. The final score and date of verification, as well as other related details, may be stored in the database as well.

The invention also used a number of adaptation techniques, in addition to channel adaptation. These techniques include fusion adaption, threshold adaption and model adaption.

Fusion adaptation modifies the fusion function for n classifiers, $S(\alpha)$. The fusion function provides more weight to some classifiers than to others. Fusion adaptation dynamically reallocates the weight between the classifiers, preferably by changing a fusion constant, $\alpha$.

Threshold adaptation dynamically modifies the stored threshold value over time. The initial threshold is determined during enrollment using voice samples. By further using information on the success of recent verification attempts, the decision threshold can be better estimated.

Model adaptation changes the models learned during the enrollment component dynamically over time, to track aging of the user's voice. For example, every time a user is successfully verified, the test data may be considered as enrollment data, and the classifier trained and modeled using the steps following automatic blind segmentation (in the enrollment component). Model adaptation effectively increases the number of enrollment samples and improves the accuracy of the system.

3. "Bootstrapping" Component Summary

Bootstrapping is used to generate a pool of speech data representative of the speech of nonspeakers, or "antispeakers." This data is used during enrollment to train the discriminant training-based classifiers. Bootstrapping involves obtaining voice samples from antispeakers, preprocessing the voice samples (as in the enrollment phase), and inverse channel filtering the preprocessed voice samples. Inverse channel filtering removes the characteristics of the channel on which the antispeaker voice sample is obtained. After inverse channel filtering, feature generation and automatic blind voice segmentation occur, as in the enrollment component. The segments and feature vectors are stored in an antispeaker database for use by the enrollment component.

BRIEF DESCRIPTION OF THE DRAWINGS

FIG. 1B shows pseudo-code for creating a filter to perform the channel estimation shown in FIG. 1A.

DESCRIPTION OF THE PREFERRED EMBODIMENT(S)

The system of the present invention includes an enrollment component, a testing component, and a bootstrap component. The enrollment component uses antispeaker data to generate and store information concerning a user's voice. The information concerning the user's voice is compared to the voice undergoing verification (testing) by the test component. The bootstrap component is used to provide initial antispeaker data for use by the enrollment component, such that the enrollment component may properly perform its function of generating data concerning the user's voice.

1. Enrollment Component- Detailed Description

The enrollment component is used to store information (using supervised learning) about a known user's voice into a voice print database, so that this information is available for future comparisons. In the preferred embodiment, the enrollment component also stores information concerning the channel on which the user provides the speech, the "enrollment channel" into the voice print database.

Figure 1A:
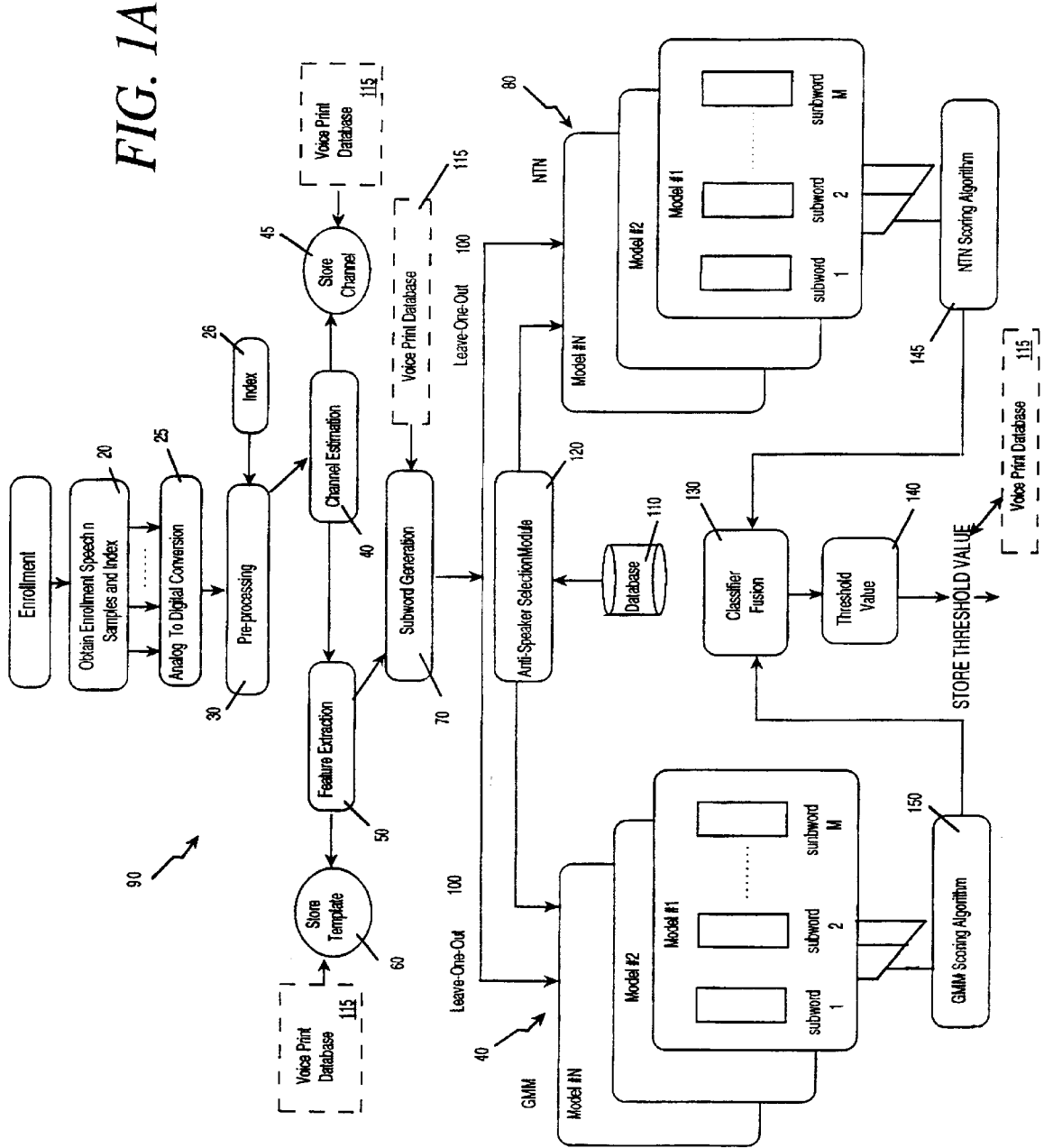
FIG. 1A is a diagram of a enrollment component of the present invention.

FIG. 1A shows the enrollment component 10. As shown, the first step 20 is to obtain enrollment speech (the password) and to obtain 26 an index, such as the user's name or credit card number. The enrollment speech may be obtained via a receiver, telephone or other sources, and be received from any transmission media, digital or analog, including terrestrial links, land lines, satellite, microwave, etc . . . More than one sample of enrollment speech should be supplied, each of which is used to generate multiple data sets. Preferably, four enrollment samples are supplied and processed.

The enrollment speech is then analog-to-digital converted 25, if necessary. Analog-to-digital conversion can be performed with standard telephony boards such as those manufactured by Dialogic. A speech encoding method such as ITU G711 standard $\mu$ and A law can be used to encode the speech samples. Preferably, a sampling rate of 8000 Hz is used. Alternatively, the speech may be obtained in digital format, such as from an ISDN transmission. In such a case, a telephony board is used to handle Telco signaling protocol.

In the preferred embodiment, the computer processing unit for the speaker verification system is an Intel Pentium platform general purpose computer processing unit (CPU) of at least 100 MHz having about 10 MB associated RAM memory and a hard or fixed drive as storage. Alternatively, an additional embodiment could be the Dialogic Antares card.

The digital enrollment speech is then pre-processed 30. Preprocessing may include one or more of the following techniques, as follows:

Digital filtering using pre-emphasis. In this case, a digital filter $H(z)=1-\alpha z^{-1}$ is used, where $\alpha$ is set between 0.9 and 1.0.

Silence removal using energy and zero-crossing statistics. The success of this technique is primarily based on finding a short interval which is guaranteed to be background silence (generally found a few milliseconds at the beginning of the utterance, before the speaker actually starts recording). Thresholds are set using the silence region statistics, in order to discriminate speech and silence frames.

Silence removal based on an energy histogram. In this method, a histogram of frame energies is generated. A threshold energy value is determined based on the assumption that the biggest peak in the histogram at the lower energy region shall correspond to the background silence frame energies. This threshold energy value is used to perform speech versus silence discrimination.

DC Bias removal to remove DC bias introduced by analog-to-digital hardware or other components. The mean value of the signal is computed over the entire voice sample and then is subtracted from the voice samples.

In the preferred embodiment, the following preprocessing is conducted: silence removal using the energy histogram technique (20 bins in histogram), signal mean removal to remove DC bias, and signal pre-emphasis using filter $\alpha=0.95$. The preprocessing is preferably conducted using hamming windowed analysis frames, with 30 millisecond analysis frames and 10 millisecond shifts between adjacent frames.

Following preprocessing 30, channel estimation 40 is performed. This procedure stores characteristics of the enrollment channel in the voice print database 115. The voice print database 115 may be RAM, ROM, EPROM, EEPROM, hard disk, CD ROM, writable CD ROM, minidisk, a file server, or other storage device. In order to estimate the channel, the distortion present on the channel is considered.

A speech signal with frequency spectrum $S(\omega)$ is distorted by a transmission channel with frequency response $X(\omega)$. The frequency spectrum of the distorted speech $\hat{S}(\omega)$ is given as:

$$\hat{S}(\omega)=S(\omega)X(\omega)$$

If the logarithm and inverse Fourier transform ($\mathfrak{I}^{-1}$) of the magnitude of both sides of the equation are taken, the following equation results:

$$\mathfrak{I}^{-1}\log(|\hat{S}(\omega)|)=\mathfrak{I}^{-1}\log(|S(\omega)|)+\mathfrak{I}^{-1}\log(|X(\omega)|)$$

then, in cepstral domain:

$$\hat{c}(n)=c(n)+x(n)$$

Because cepstrum is defined as the inverse Fourier transform of the logarithm of short-time spectral magnitude. Time invariant convolution distortion $X(\omega)$ can be eliminated by Cepstral Mean Subtraction (CMS) or Cepstral Mean Normalization (CMN), which is averaging in the cepstral domain, and subtracting the average component. For example:

$$c_{clean}(n)=c(n)+x(n)-\text{mean}[\hat{c}(n)]$$

Thus, CMS may be conducted on the cepstral features obtained for the voice signal to remove the distortion of the channel.

While CMS may be used alone to remove the effects of the channel distortion, the cepstral mean may include information other than the estimate of the time-invariant convolutional distortion, such as coarse spectral distribution of the speech itself. Pole filtering attempts to decouple the speech information from the channel information in the cepstral mean. Since cepstrum is the weighted combination of LP poles or spectral components, the effect of individual components on the cepstral mean was examined. It was found that broad band-width components exhibited smoother frequency characteristics corresponding to the "roll-off" of channel distortion, assuming that narrow band-width components in the inverse filter were influenced more by speech characteristics. Thus, the narrow bandwidth LP poles were selectively deflated by broadening their bandwidth and keeping their frequency the same.

Therefore, for every frame of speech, the pole filtered cepstral coefficients (PFCC) are computed along with LP-derived cepstral coefficients (LPCC). To achieve cepstral mean subtraction, the mean of the PFCC is subtracted from the LPCC, instead of the regular LPCC mean. This procedure is called pole filtered cepstral mean subtraction (PF-CMS).

To perform PF-CMS, the procedure outlined in the flow chart of FIG. 1B is followed. With reference to FIG. 1B, the first block of pseudo-code 42 sets the pole bandwidth threshold. Next $z_i$ and $Z_i$ are obtained and LPCC and PFCC are evaluated 44. This allows the mean of the PFCC vectors to be computed 46, which may be saved 48 as a channel estimate in the voice print database 115. The PFCC mean may be used to create an LPC filter.

Figure 1C:
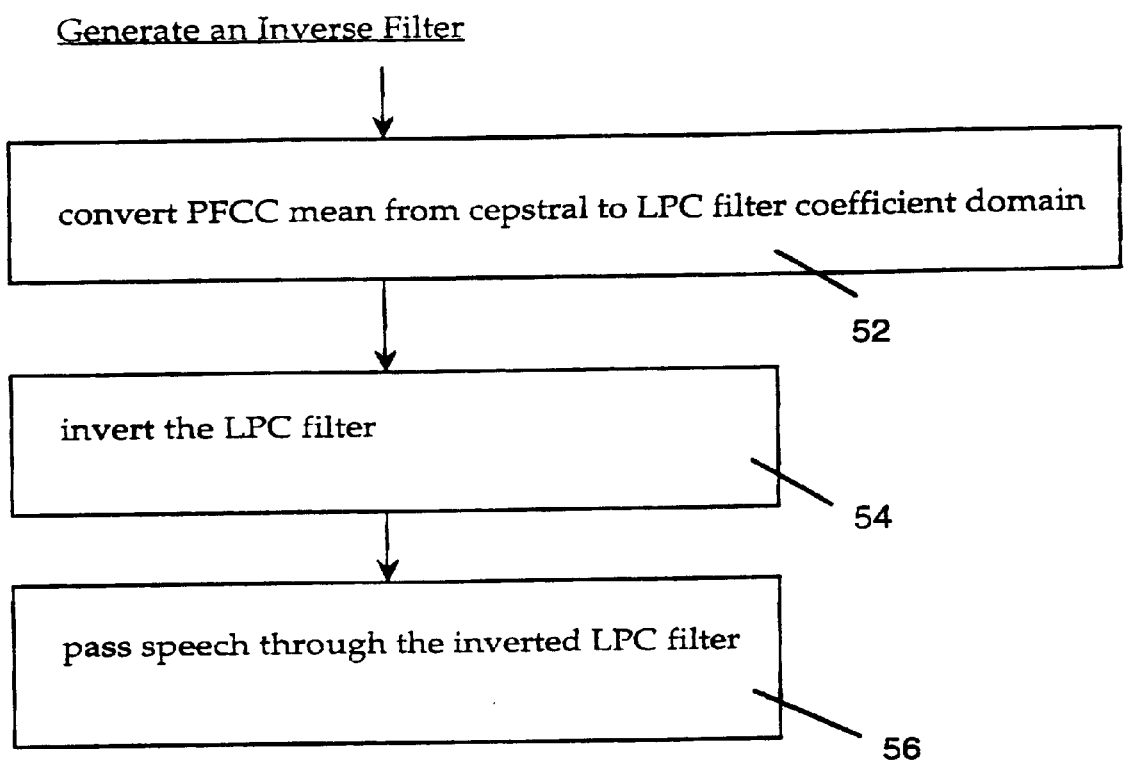
FIG. 1C shows pseudo-code for inverting the filter of FIG. 1B.

An inverse of this filter may be generated as shown in FIG. 1C. First, the PFCC mean is converted from cepstral to the LPC filter coefficient domain 52. Next, the LPC filter may be inverted 54, and speech passed through the inverted filter 56.

Although not preferred, the preprocessed speech during enrollment may be inverse-filtered by inverting the filter of FIG. 1C, filter (as described below with respect to FIG. 3B). While inverse filtering will theoretically remove the enrollment channel distortion, it is preferred to inverse filter the test speech (on the testing channel) and then feed the test speech through the saved enrollment filter, as described below with reference to FIG. 3A.

After preprocessing 30, feature extraction 50 is performed on the processed speech. Feature extraction may occur after (as shown) or simultaneously with the step of channel estimation 40 (in parallel computing embodiments). Spectral features are represented by speech feature vectors determined within each frame of the processed speech signal. In feature extraction 50, spectral feature vectors can be obtained with conventional methods such as linear predictive (LP) analysis to determine LP cepstral coefficients, Fourier Transform Analysis and filter bank analysis. One method of feature extraction 50 is disclosed in U.S. Pat. No. 5,522,012, entitled "Speaker Identification and Verification System," issued on May 28, 1996 and incorporated herein by reference. A preferred method for obtaining spectral feature vectors is performing a 12th order TP-PFC obtained from a 12th order linear prediction (LP) with alpha=0.7.

The result of feature extraction 50 is that vectors representing a template of the password are generated. This may occur as described with respect to FIG. 6. This template is stored 60 in the voice print database 115. Following storage of the template 60, the speech is segmented into sub-words for further processing.

The preferred technique for subword generation 70 is automatic blind speech segmentation, or "Blind Clustering" such as disclosed in U.S. patent application Ser. No. 08/827,562 entitled "Blind Clustering of Data With Application to Speech Processing Systems", filed on Apr. 1, 1997, and its corresponding U.S. provisional application No. 60/014,537 entitled "Blind Speech Segmentation", filed on Apr. 2, 1996, both of which are herein incorporated by reference. During enrollment in the speaker verification system, the automatic blind speech segmentation determines the number of subwords in the password and the location of optimal subword boundaries. Additionally, the subword durations are normalized by the total duration of the voice phrase and stored in the voice print database 115 for subsequent use during testing (force segmentation).

Alternative approaches to subword generation 70 which generate segments of speech may be used with the present invention. A first alternative is the traditional approach, where segmentation and labelling of speech data is performed manually by a trained phonetician using listening and visual cues.

A second alternative to subword generation 70 is automatic hierarchical speech segmentation, which involves a multi-level, fine-to-course segmentation. This segmentation can be displayed in a tree-like fashion called dendogram. The initial segmentation is a fine level with the limiting case being a vector equal to one segment. Thereafter, a segment is chosen to be merged with either its left or right neighbor using a similarity measure. This process is repeated until the entire utterance is described by a single segment.

A third alternative to subword generation 70 is automatic non-hierarchical speech segmentation. This segmentation method attempts to locate the optimal segment boundaries by using a knowledge engineering-based rule set or by extremizing a distortion or score metric.

After subwords are obtained, each sub-word is then modeled 80, 90, preferably with multiple classifier modules. Preferably a first neural tree network (NTN) 80 and a second Gaussian mixture model (GMM) 90 are used. The NTN 80 provides a discriminative-based model and the GMM 90 provides one that is based on a statistical measure. In a preferred embodiment a leave-one-out method data resampling scheme 100 is used. Data resampling 100 is performed by creating multiple subsets of the training data, each of which is created by leaving one data sample out at a time. The subsets of the training data are then used to train multiple models of each of the classifiers, which are stored in the voice print database 115. Thus, FIG. 1A shows N models for the NTN classifier 80 and N models for the GMM classifier 90. For model #1 of the NTN classifier, a enrollment sample, such as the 1st sample, is left out of the classifier.

In order to train an NTN model 80 for a given speaker, it is necessary to appropriately label the subword data available in the antispeaker database 110. The antispeaker database 110 may be RAM, ROM, EPROM, EEPROM, hard disk, CD ROM, a file server, or other storage device.

The subword data from the speaker being trained is labeled as enrollment speaker data. Because there is a no linguistic labelling information in the antispeaker database 110, the entire database 110 is searched for the closet subword data from other speakers. This data is labeled the anti-speaker data. The mean vector and covariance matrix of the subword segments obtained from subword generation are used to find the "close" subwords. An anti-speaker module 120 searches the antispeaker database 110 to find the "close" subwords of antispeaker data, which are used in the NTN model 20. Preferably, 20 "close" subwords are identified. The anti-speaker data in the antispeaker database 110 is either manually created, or created using a "bootstrapping" component, described below with reference to FIG. 11.

Because a "leave-one-out" system 100 is employed with multiple (N) samples, the classifier models 80, 90 are trained by comparing antispeaker data with N-1 samples of enrollment speech. Both modules 80, 90 can determine a score for each spectral feature vector of a subword segment. The individual scores of the NTN 80 and GMM 90 modules can be combined, or "fused" by a classifier fusion module 130 to obtain a composite score for the subword. Since these two modeling approaches tend to have errors that are uncorrelated, it has been found that performance improvements can be obtained by fusing the model outputs 130. In the preferred embodiment, the results of the neural tree network 80 and the Gaussian mixture model 90 are fused 130 using a linear opinion pool, as described below. However, other ways of combining the data can be used with the present invention including a log opinion pool or a "voting" mechanism, wherein hard decisions from both the NTN and GMM are considered in the voting process.

With continued reference to FIG. 1A, one of modules used to model the subword segments of the user password is an NTN module 80. The NTN is a hierarchical classifier that uses a tree architecture to implement a sequential linear decision strategy. Specifically, the training data for a NTN consists of data from a target speaker, labeled as one, along with data from other speakers (antispeaker data) that are labeled as zero. The NTN learns to distinguish regions of feature space that belong to the target speaker from those that are more likely to belong to an impostor. These regions of feature space correspond to leaves in the NTN that contain probabilities. These probabilities represent the likelihood of the target speaker having generated data that falls within that region of feature space. In the preferred embodiment, NTN modeling 220 is performed using the following forward pruning criteria: (a) maximum depth of four, (b) pruned nodes containing less than 10% of data vectors at the root. The NTN scores for individual feature vectors are accumulated across subwords by an NTN scoring algorithm 145. The functioning of NTN networks with respect to speaker recognition is disclosed in K. R. Farrell, R. J. Mammone, and K. T. Assaleh, "Speaker Recognition using Neural Networks and Conventional Classifiers", *IEEE Trans. Speech and Audio Processing*, 2(1), part 2 (1994), and U.S. patent application Ser. No. 08/159,397, filed Nov. 29, 1993, entitled "Rapidly Trainable Neural Tree Network", U. S. patent application Ser. No. 08/479,012 entitled "Speaker Verification System," U.S. patent application Ser. No. 08/827,562 entitled "Blind Clustering of Data With Application to Speech Processing Systems", filed on Apr. 1, 1997, and its corresponding U.S. Provisional Application No. 60/014,537 entitled "Blind Speech Segmentation", filed on Apr. 2, 1996, each of which is incorporated herein by reference in its entirety.

As discussed previously, a Gaussian mixture model (GMM) 90 is also used to model each of the subwords. In the GMM, a region of feature space for a target speaker is represented by a set of multivariate Gaussian distributions. In the preferred embodiment, the mean vector and covariance matrix of the subword segments are obtained as a by-product of subword generation using automatic blind speech segmentation and are saved as part of the GMM module, as described in U.S. patent application Ser. No. 08/827,562 entitled "Blind Clustering of Data With Application to Speech Processing Systems", filed on Apr. 1, 1997, and its corresponding U.S. provisional application No. 60/014,537 entitled "Blind Speech Segmentation", filed on Apr. 2, 1996, both of which are herein incorporated by reference. The GMM probability distribution function is expressed as:

$$p(x) = \sum_{i=1}^{G} P(\omega_i) p(x/\mu_i, \sigma^2).$$

Each of the G mixture components is defined by a mixture weight $P(\omega_i)$ and multi-dimensional normal distribution function $p(x/\mu_i, \sigma_\iota^2)$, where $\mu_i$ is the mean vector and $\sigma_\iota$ is the covarience matrix. In the preferred embodiment, the normal distribution is constrained to have a diagonal covariance matrix defined by the vector $\sigma_\iota$. The PDF is used to produce the sub-word GMM score.

A scoring algorithm 145, 150 is used for each of the NTN and GMM models. The output score (estimated a-posteriori probabilities) of the subword models is combined across all the subwords of the password phrase, so as to yield a composite score for the test utterance.

The scoring algorithm 145, 150 for combining the score the subword models 80, 90 can be based on either of the following schemes:

(a) PHRASE-AVERAGE: Averaging the output scores for the vectors over the entire phrase, (b) SUBWORD-AVERAGE: Average the score of vectors within a subword, before averaging the (averaged) subword scores, and (c) SUBWORD-WEIGHING: Same as (b) subword-average scoring, but the (averaged) subword scores are weighted in the final averaging process.

Transitional (or durational) probabilities between the subwords can also be used while computing the composite score for the password phrase. The preferred embodiment is (b) subword-average scoring. The result of scoring provides a GMM score and an NTN score, which must then be combined.

In the preferred embodiment, a classifier fusion module 130 using the linear opinion pool method combines the NTN score and the GMM score. Use of the linear opinion pool is referred to as a data fusion function, because the data from each classifier is "fused," or combined.

The data fusion function for n classifiers, $S(\alpha)$, is governed by the following linear opinion pool equation:

$$S(\alpha) = \sum_{i=1}^{n} \alpha_i s_i$$

In this equation $S(\alpha)$ is the probability of the combined system, $\alpha_i$ are weights, and $s_i(\alpha)$ is the probability output by the $i^{th}$ classifier, and n is the number of classifiers; $\alpha_i$ is between zero and one and the sum of all $\alpha_i$'s is equal to one. If two classifiers are used (n=2), $s_1$ is the score of the first classifier and $s_2$ is the score of the second classifier. In this instance the equation becomes:

$$S = \alpha s_1 + (1-\alpha) s_2$$

The variable $\alpha$ is set as a constant (although it may be dynamically adapted as discussed below), and functions to provide more influence on one classifier method as opposed to the other. For example, if the NTN method 80 was found to be more accurate, the first classifier $s_1$ would be more important, and $\alpha$ would be made greater than 0.5, or its previous value. Preferably, $\alpha$ is only incremented or decremented by a small amount, $\epsilon$.

Once the variables in the fusion equation are known, a threshold value 140 is output and stored in the voice print database 115. The threshold value output 140 is compared to a "final score" in the testing component to determine whether a test user's voice has so closely matched the model that it can be said that the two voices are from the same person.

2. Testing Component- Detailed Description

Figure 2:
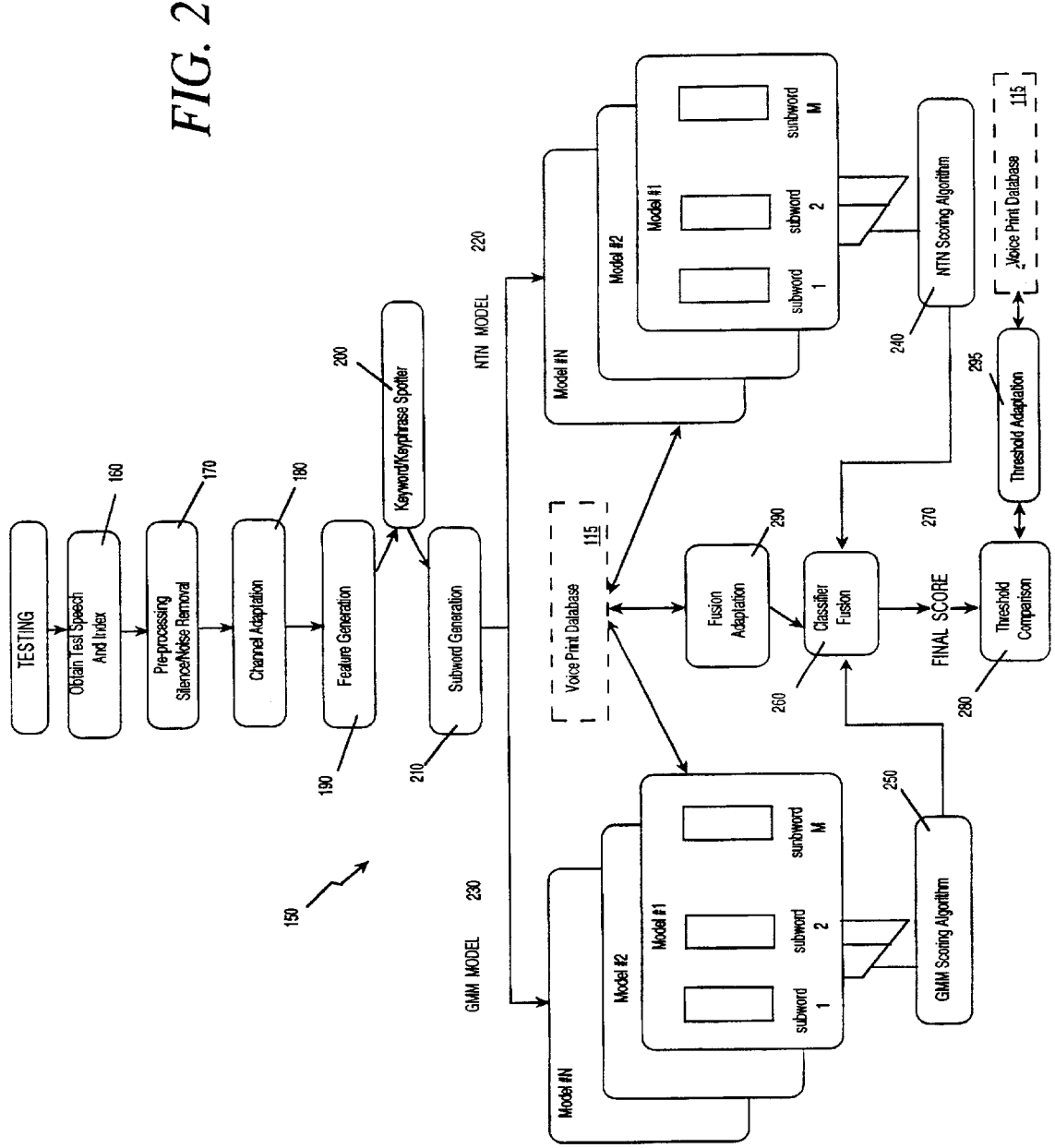
FIG. 2 is a diagram of a testing component of the present invention.

FIG. 2 shows a general outline of the testing component 150, which has many features similar to those described with respect to the enrollment component 10 of FIG. 1A. The testing component 150 is used to determine whether test speech received from a user sufficiently matches identified stored speech characteristics so as to validate that the user is in fact the person whose speech was stored.

First, the test speech and index information 160 is supplied to the test component. The index information is used to recall subword/segmentation information and the threshold value 140 from the voice print database 115. The index information may be any nonvoice data which identifies the user, such as the user's name, credit card number, etc . . .

After obtaining the test speech and index information, the test speech is preprocessed 170. Preprocessing 170 may be performed as previously described in the enrollment component 10 (FIG. 1A). Preferably, the same preprocessing 30,170 is conducted on the test speech as was performed during enrollment.

Figure 3A:
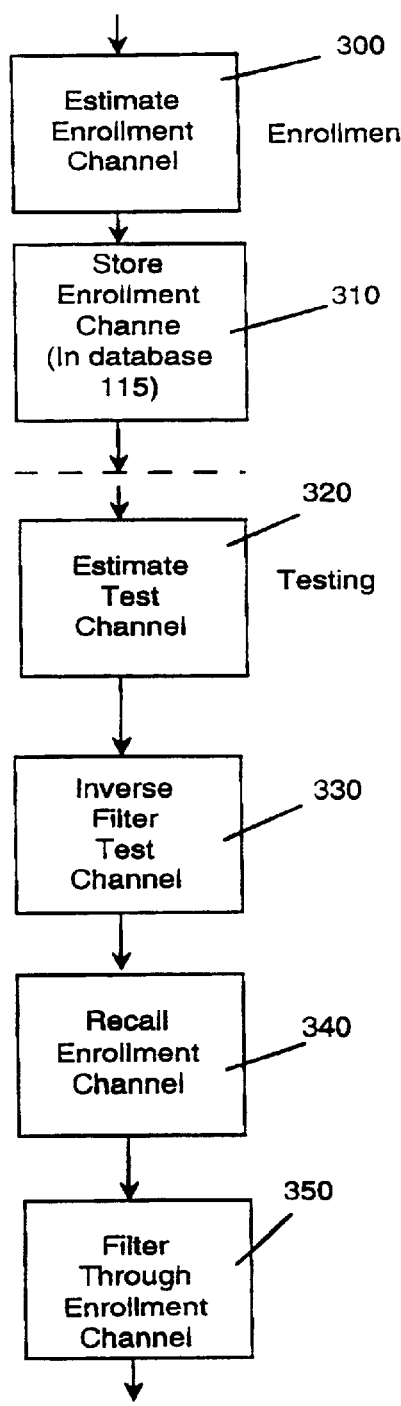
FIGS. 3A and 3B are flow diagrams of a channel adaptation module, shown in FIG. 2, of the present invention.

The fact that a speaker's model is conventionally built using enrollment speech that is recorded under a specific, controlled environment implies that the model carries not only the voice print but also the channel print. Therefore, following preprocessing, channel adaptation 180 is performed. Channel adaptation 180 adapts the system to the particular enrollment channel and test channel. Channel adaptation 180 includes processing under both the enrollment component 10 and the test component 150. FIGS. 3A and 3B show alternatives of channel adaptation 180.

Figure 3B:
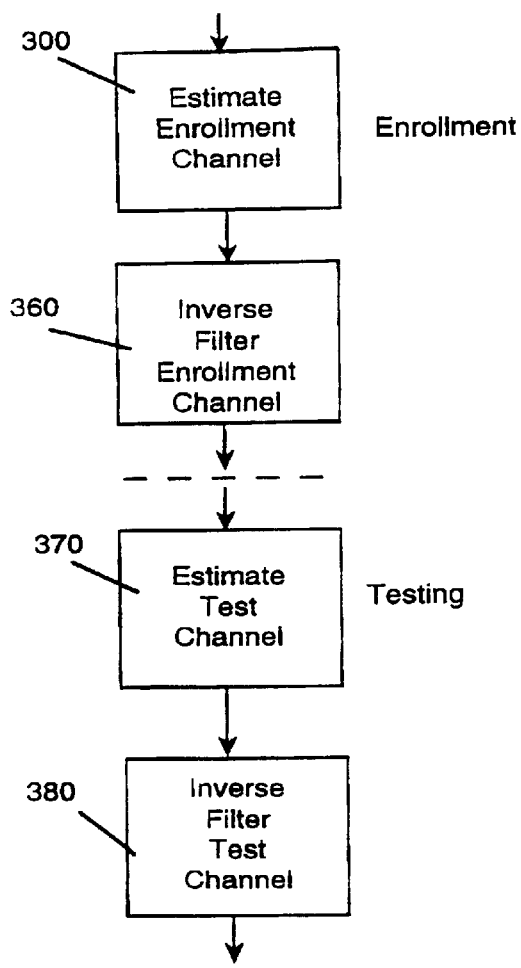

As previously mentioned with respect to FIG. 1A, the enrollment channel is estimated 40 during the enrollment component 10, also shown in FIGS. 3A and 3B at 300. As shown in FIG. 3A, the enrollment channel estimate is also stored 310 in the voice print database 115 during the enrollment component. The enrollment channel may be estimated and stored using the procedures previously discussed with respect to FIG. 1A.

As shown in FIG. 3A, the test channel is estimated 320 during the testing component. The test channel may be estimated by generating a filter using the procedures previously discussed with respect to FIG. 1B. After generating the filter, the test speech is inverse filtered through the test channel 330. To achieve this, the test speech is passed through the inverse filter of the test channel using the procedure of FIG. 1C. This process removes the distortion of the test channel from the test speech. Now, the distortion of the enrollment channel is added to the test speech by filtering the test speech through the enrollment channel. To perform this, the saved enrollment filter is recalled 340 and the test speech is filtered through the enrollment filter 350.

The procedure of FIG. 3A stores the enrollment data with the enrollment channel distortion during the enrollment component, and then removes the distortion of the test channel and adds the distortion of the original enrollment channel during testing. As an alternative, shown in FIG. 3B, it may be desired to remove the enrollment channel distortion during enrollment, and then remove the test channel distortion during testing.

As shown in FIG. 3B, the enrollment channel is estimated 300 during the enrollment component. Next, the enrollment speech is filtered through an inverse of the enrollment channel filter 360. In other words, the enrollment speech is inverse filtered using the techniques previously discussed. During the testing phase the test channel is estimated 370, and an inverse filter constructed using the techniques previously described. The test speech is then filtered through the inverse filter 380.

Using either channel adaptation technique, the system adapts to account for the channel distortion on the enrollment channel and on the test channel. It has been found that the technique shown in FIG. 3A is preferred.

In the scenario of cellular fraud control, the concept of channel adaptation 180 can be used to validate the user since the channel print carries the characteristics of the particular cellular handset of which the speaker is an authorized user, and therefore creates an association between the voice print and the phone channel print. The combination of voice print and phone print ensures that a particular cellular handset can only be used by its registered subscriber. However, in application such as bill-to-third party phone services where the users are allowed to have access to the service from various locations, an authorized user's request for service may be denied due to the phone print mismatch.

Channel adaptation 180 provides a solution to this problem. It first removes the phone and channel print of the test environment from the test speech by performing an inverse filtering of the channel. Thereafter, channel adaptation can add the phone and channel print of the training environment to the speech so that it looks as if the verification speech is recorded through the training channel.

Channel adaptation 180 in this manner can still be advantageous in cellular fraud control when the channel mismatch is primarily due to variations in the cellular network rather the phone set. The channels can be estimated using techniques such as pole-filtered cepstrum, as described in FIG. 1B, LP derived cepstrum mean, fast Fourier transform (FFT)-derived cepstrum mean as well as FFT based periodogram of the speech signal. Pole-filtered cepstrum, as shown in FIG. 1B, is the preferred method.

Referring to FIG. 2, feature extraction 190 is performed after preprocessing. Feature extraction 190 may occur immediately after channel adaption 180, or may occur simultaneously with channel adaption 180 (in a multiple processor embodiment). Feature extraction is conducted using any of the techniques previously described with respect to FIG. 2, and is preferably conducted using the same techniques performed during enrollment.

Following feature extraction 190, key word/key phrase spotting 200 is performed.

The key-word/key-phrase spotter 200 separates the password (test speech) from the leading and trailing background noise and sounds using a template of the password generated from the enrollment speech. The template is generated by determining the common part in the repeated utterances of the password during the training. During the verification, the template is compared with the entire test utterance to search for the portion of the speech that best matches the password template.

The preferred embodiment of the key-word spotter is based on the dynamic time warping (DTW) method. During the enrollment, the feature vector representation of all the training repetitions of the password are warped to the shortest one using the DTW method. The feature vector based template of the password is generated by taking an average of the warped version of all the password repetitions. During the verification, the word template is compared with the entire test utterance. The part of the test utterance that yields the minimum warping distance to the template is regarded as the actual spoken password.

The DTW algorithm uses a reference template and test sample. The reference template is represented as R, were R(n) n=1, . . . , N represents the multidimensional feature vector at the nth analysis frame of the reference speech signal. The test template is represented as T, where T(m) m=1, . . . , M represents the multidimensional feature vector at the mth analysis frame of the test speech utterance. The DTW algorithm attempts to find an optimal path w(.) in the (n/m) plane, such that the path function minimizes the total distance function D.

The path function is: w(n)=m.

The total distance function D is of the form:

$$D = \sum_{n=1}^{N} d(R(n), T(w(n))).$$

The expression d(R(n), T(w(n))) is the local distance between the frame n of the reference pattern and the frame m=w(n) of the test pattern.

Figure 4:
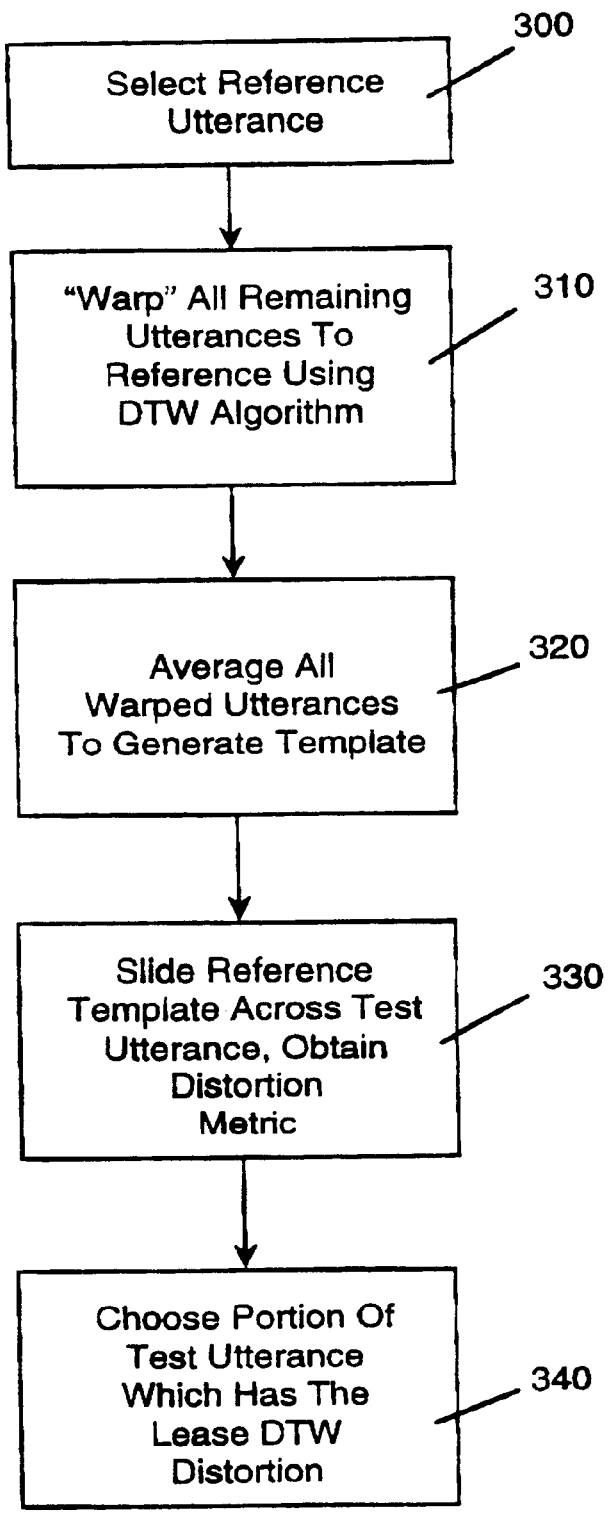
FIG. 4 is a flow diagram of a key word/key phrase spotter, shown in FIG. 2, of the present invention.

To perform key word/key phrase spotting 200, a template is trained and then the phrase spotted on the test utterance, as shown in FIG. 4.

Figure 5:
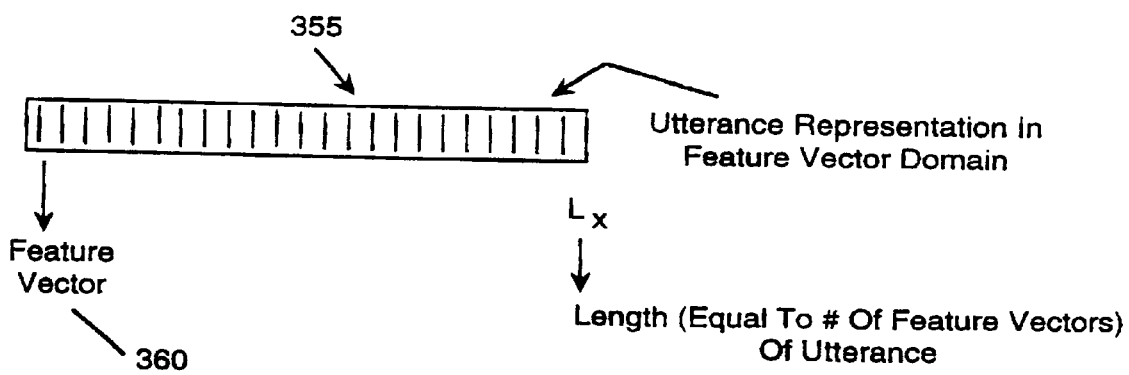
FIG. 5 is a diagram of an utterance representation in the feature vector domain.

As shown in FIG. 4, the first step of key word/key phrase spotting 200 is to select a reference utterance 300. The reference utterance may be one of the utterances collected during enrollment. FIG. 5 shows a symbolic representation of any utterance 355 in the feature vector domain. The utterance 355 contains a number of feature vectors 350 and is length $L_x$, where x is the number of feature vectors.

The reference utterance 350 could be chosen in a number of ways. The preferred method is to select the enrollment utterance with the minimum duration.

$$\text{selection} = \operatorname*{argmin}_{i}\{L_i\} \quad i = 1, 2, 3, 4 \ldots \quad \text{where}$$

$L_i$ is the utterance length of utterances $i = 1, 2, 3, 4$.

A second approach to select the enrollment utterance with median duration. Thus the enrollment utterances of lengths $L_1, L_2, L_3, L_4$ are sorted in order of increasing length, for example [ $L_2$, $L_4$, $L_1$, $L_3$] (using the utterances of FIG. 6). In this case, $L_4$ is the reference utterance of because it is the median value.

A third approach is to select an utterance with a duration closest to the average duration.

$$L_{avg} = (L_1 + L_2 + L_3 + L_4)/4$$

$$\text{selection} = \operatorname*{argmin}_{i} |L_{avg} - L_i| \quad i = 1, 2, 3, 4$$

A fourth approach is to select an utterance with minimum combined distortion with respect to the other utterances. A distortion matrix $\underline{D}$ is created:

$$\underline{D} = \begin{matrix} d_{11} & d_{12} & d_{13} & d_{14} \\ d_{21} & d_{22} & d_{23} & d_{24} \\ d_{31} & d_{32} & d_{33} & d_{34} \\ d_{41} & d_{42} & d_{43} & d_{44} \end{matrix}$$

The distortion, $d_{ij}$ is the DTW distortion between utterance i and utterance j. The utterance-wise combined distortion is:

$$d_i = \sum_{j=1}^{4} d_{ij} + \sum_{j=1}^{4} d_{ji} \quad i = 1, 2, 3, 4$$

The utterance selected is the one with minimum $d_i$.

$$\text{Selection} = \operatorname*{argmin}_{i} d_i$$

Figure 6:
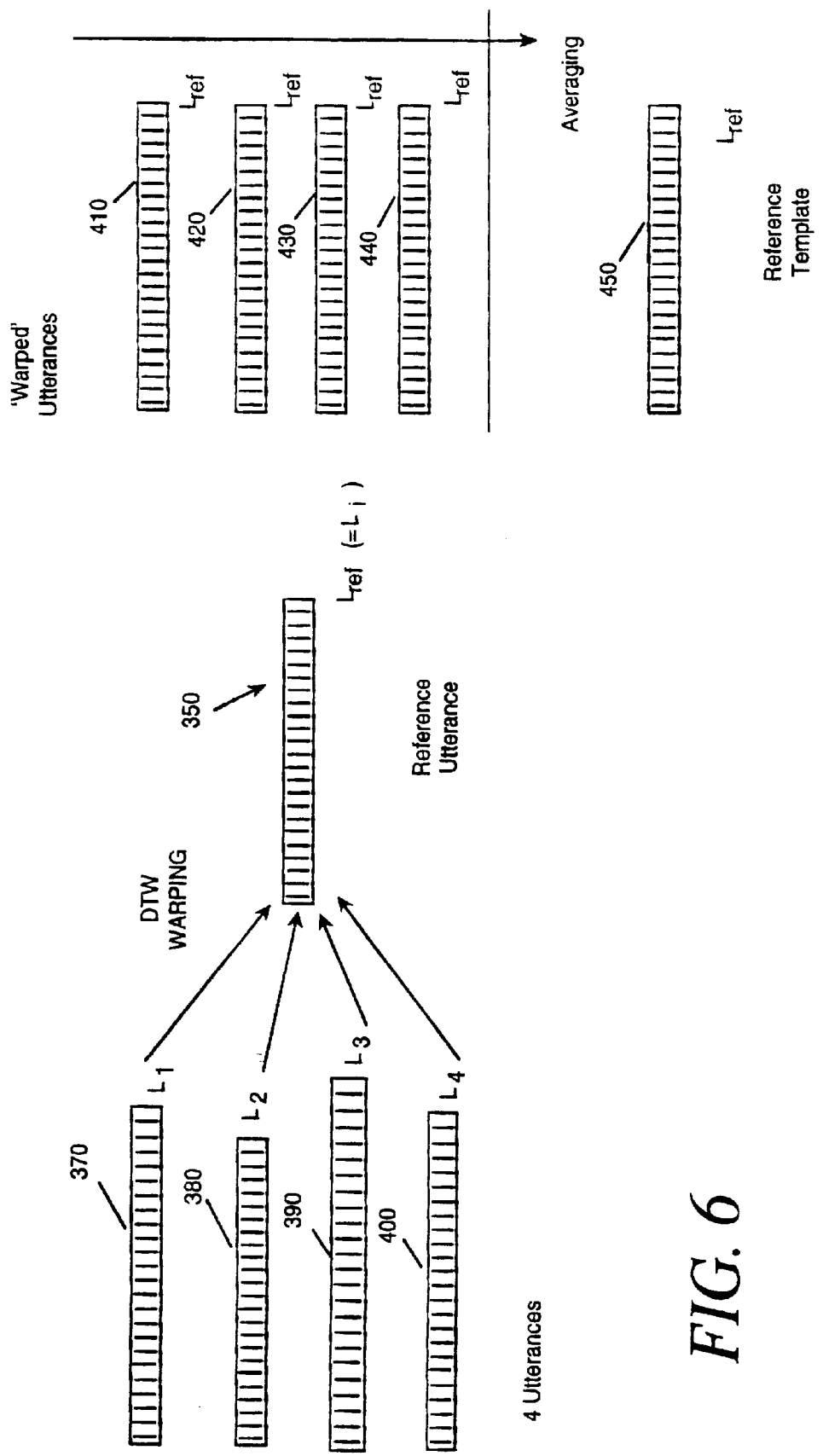
FIG. 6 is a diagram of dynamic time warping used to obtain a reference template in the key word/key phrase spotter of FIG. 4.

After selecting 300 a reference utterance 350, all the remaining utterances are "warped" 310 onto the reference utterance 350 using the DTW algorithm. FIG. 6 shows four utterances 370, 380, 390 and 400 of different lengths ($L_1$, $L_2$, $L_3$, $L_4$) "warped" onto the reference utterance 350, which produces four "warped" utterances 410, 420, 430 and 440 of length $L_{ref}$. The four warped utterances 410, 420, 430 and 440 are averaged 320 to form a reference template 450 of length $L_{ref}$.

Figure 7:
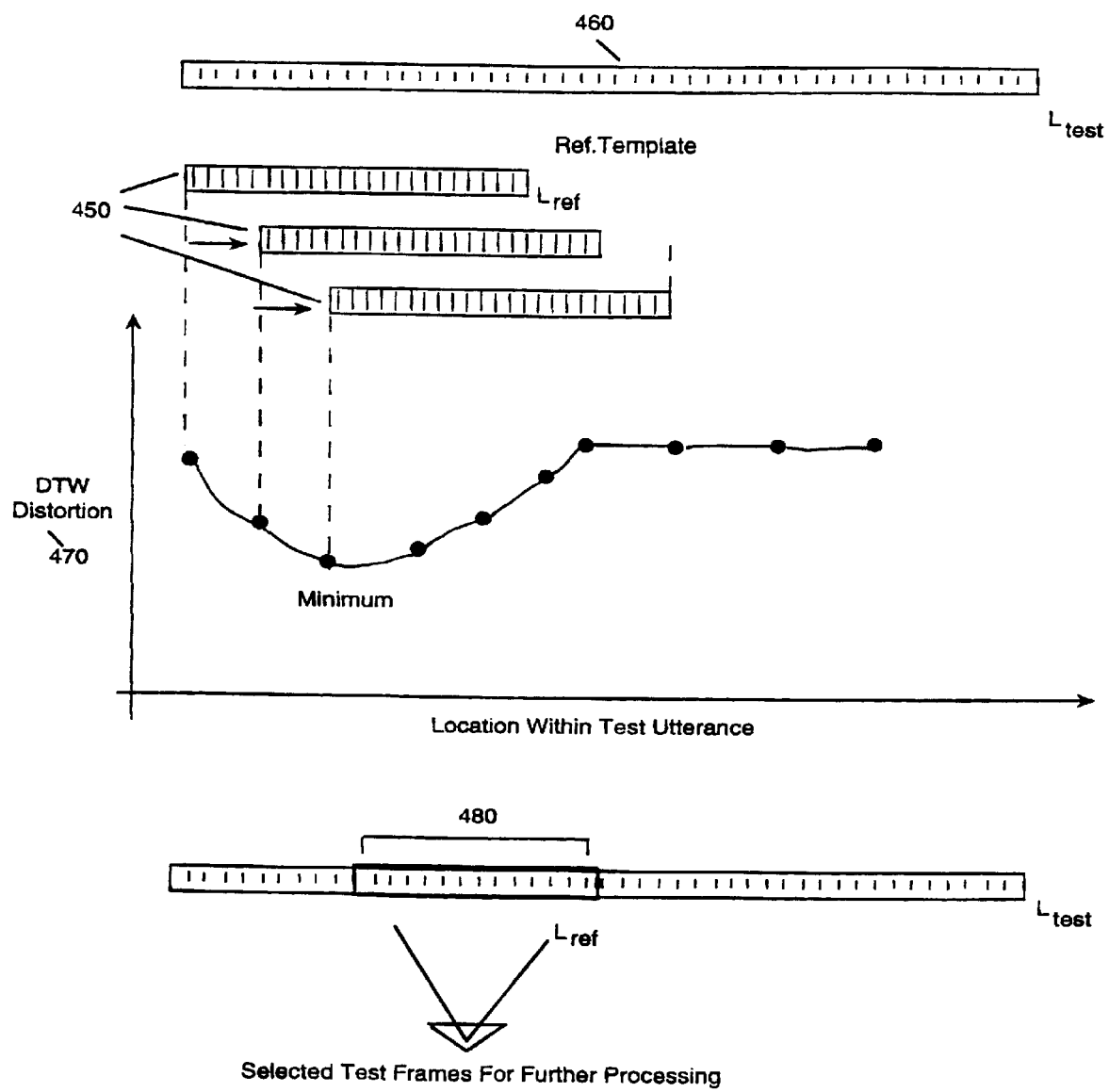
FIG. 7 is a diagram of dynamic time warping distortion, used to match the reference template of FIG. 6 to test speech.

During verification, as shown in FIG. 4 and FIG. 7, the reference template 450 is slid across the test utterance 460, and the DTW distortion 470 is computed for each point 330. FIG. 7 shows the test utterance 460 of length $L_{test}$, and the reference template 450 of length $L_{ref}$ being slid across the test utterance 460. The distortion at each point 470 is also shown on the graph of FIG. 7.

Next, with reference to FIG. 4 and FIG. 7, the key word/key phrase frames 480 are selected 340 from the portion of the test utterance 460 which produces the least DTW distortion 470. The key word/key phrase has been spotted and processing can now move to subword generation.

Referring back to FIG. 2, after key word/key phrase spotting, automatic subword generation 210 occurs. Because segmentation was already performed during the enrollment component, subword generation 210 in the testing component is performed based on the subwords/segment model computed in the enrollment phase 10.

As previously described with respect to FIG. 1A, during the enrollment component 10 GMM modeling 90 was performed. The GMM modeling 90 is used in the test component subword generation 210 to "force align" the test phrase into segments corresponding to the previously formed subwords. Using the subword GMMs as reference models, Viterbi or Dynamic programming (DP) based algorithms are used to locate the optimal boundaries for the subword segments. Additionally, the normalized subword duration (stored during enrollment) is used as a constraint for force alignment since it provides stability to the algorithm. Speech segmentation using force alignment is disclosed in U.S. patent application Ser. No. 08/827,562 entitled "Blind Clustering of Data With Application to Speech Processing Systems", filed on Apr. 1, 1997, and its corresponding U.S. provisional application No. 60/014,537 entitled "Blind Speech Segmentation", filed on Apr. 2, 1996, both of which are herein incorporated by reference in their entirety.

After subword generation 210 is performed, scoring 240, 250 using the techniques previously described with respect to FIG. 2 (i.e. multiple classifiers such as GMM 230 and NTN 220) is performed on the subwords. Scoring using the NTN and GMM classifiers 220, 230 is disclosed in U.S. patent application Ser. No. 60/064069, entitled "Model Adaption System And Method For Speaker Verification," filed on Nov. 3, 1997 by Kevin Farrell and William Mistretta, U.S. patent application Ser. No. 08/827,562 entitled "Blind Clustering of Data With Application to Speech Processing Systems", filed on Apr. 1, 1997, and its corresponding U.S. provisional application No. 60/014,537 entitled "Blind Speech Segmentation", filed on Apr. 2, 1996, each of which is herein incorporated by reference in its entirety.

An NTN scoring algorithm 240 and a GMM scoring algorithm 250 are used, as previously described with respect to FIG. 1A, to provide a GMM score and a NTN score to the classifier fusion module 260.

With continued reference to FIG. 2, the classifier fusion module 260 outputs a "final score" 270. The "final score" 270 is then compared 280 to the threshold value 140. If the "final score" 270 is equal to or greater than the threshold value 140 obtained during enrollment, the user is verified. If the "final score" 270 is less than the threshold value 140 then the user is not verified or permitted to complete the transaction requiring verification.

The present invention also employs a number of additional adaptations, in addition to channel adaptation 180.

As previously described, the multiple classifier system uses a classifier fusion module 130, 260 incorporating a fusion function to advantageously combine the strength of the individual classifiers and avoid their weakness. However, the fusion function that is set during the enrollment may not be optimal for the testing in that every single classifier may have its own preferred operating conditions. Therefore, as the operating environment changes, the fusion function changes accordingly in order to achieve the optimal results for fusion. Also, for each user, one classifier may perform better than the other. An adaptable fusion function provides more weight to the better classifier. Fusion adaptation uses predetermined knowledge of the performance of the classifiers to update the fusion function so that the amount of emphasis being put on a particular classifier varies from time to time based on its performance.

As shown in FIG. 2, a fusion adaptation module 290 is connected to the classifier fusion module 280. The fusion adaptation module 290 changes the constant, $\alpha$, in the linear pool data fusion function described previously with respect to FIG. 2, which is:

$$S(\alpha) = \sum_{i=1}^{n} \alpha_i s_i$$

In the present invention two classifiers are used (NTN 80, 220 and GMM 90, 230) and $s_1$ is the score of the first classifier and $s_2$ is the score of the second classifier. In this instance the equation becomes:

$$S = \alpha s_1 + (1-\alpha)s_2$$

The fusion adaptation module 290 dynamically changes $\alpha$ to weigh either the NTN ($s_1$) or GMM ($S_2$) classifiers more than the other, depending on which classifier turns out to be more indicative of a true verification.

Figure 8:
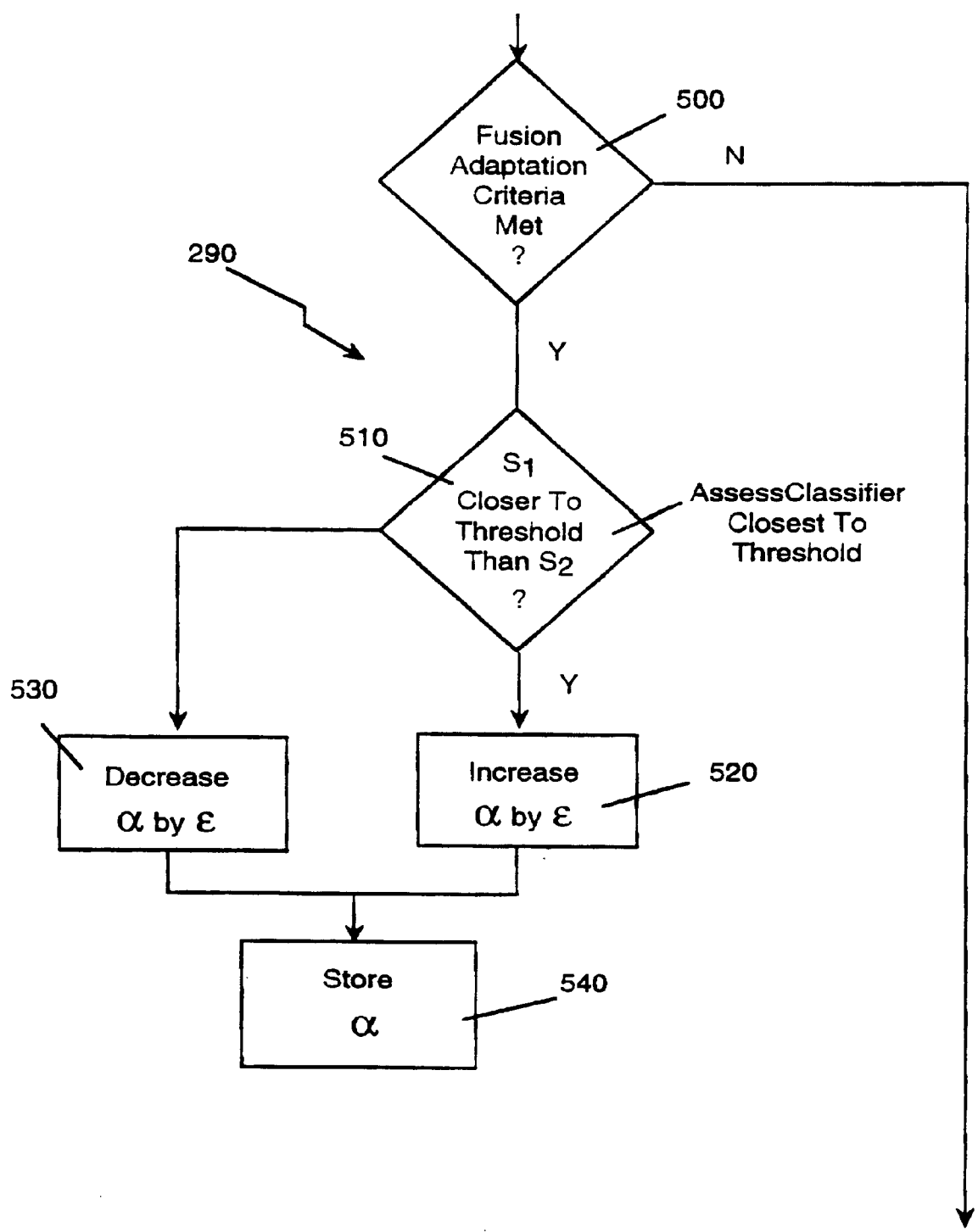
FIG. 8 is a flow diagram of a fusion adaptation module shown in FIG. 2.

The fusion adaptation module 290 is shown in FIG. 8. The first step of fusion adaptation is to determine whether the fusion adaptation criteria are met 500. The fusion adaptation criteria are met in any number of circumstances, which may be dependent on the type of voice verification system being implemented in a particular application. For example, the fusion adaptation criteria may be met in the following cases: after every five (or another predetermined number of) successful verifications, if the scores of the classifiers (i.e. the GMM score and the NTN score) differ by more than a predetermined amount, if it is found that the true user was not verified for a predetermined number of attempts (false-negative results), if it is found that an imposter was verified for one or more attempts (false-positive results), or during a time period (i.e. the first week of use by a particular user). In these cases, the system is not working at its optimal efficiency and needs further adaptation to improve. Because fusion adaptation may effect the amount of false-positive results and the amount of false-negative results, the inclusion criteria may be made dependent on the amount of tolerance which is deemed acceptable for these possibilities.

As shown in FIG. 8, if the inclusion criteria are met, the classifier closest to the threshold is assessed. Specifically, it is determined whether $s_1$ is closer to the threshold value than $s_2$ 510. If $s_1$ is closer to the threshold than $s_2$, the constant, $\alpha$, is increased 520 to provide more weight to $s_1$. If not, then $\alpha$ is decreased 530 to provide more weight to $s_2$. The amount that $\alpha$ is increased or decreased depends on the particular application, and may be a constant amount or a variable amount, depending on the amount of error in the system, the amount of tolerance for false-positive results, the amount of tolerance for false-negative results, etc . . . The modified constant, $\alpha$, is then stored 540 in the voice print database 115 for use in the testing component.

Thus, the weighing of the different classifier models may be dynamically changed to adapt the system by changing the fusion constant, $\alpha$.

Figure 9:
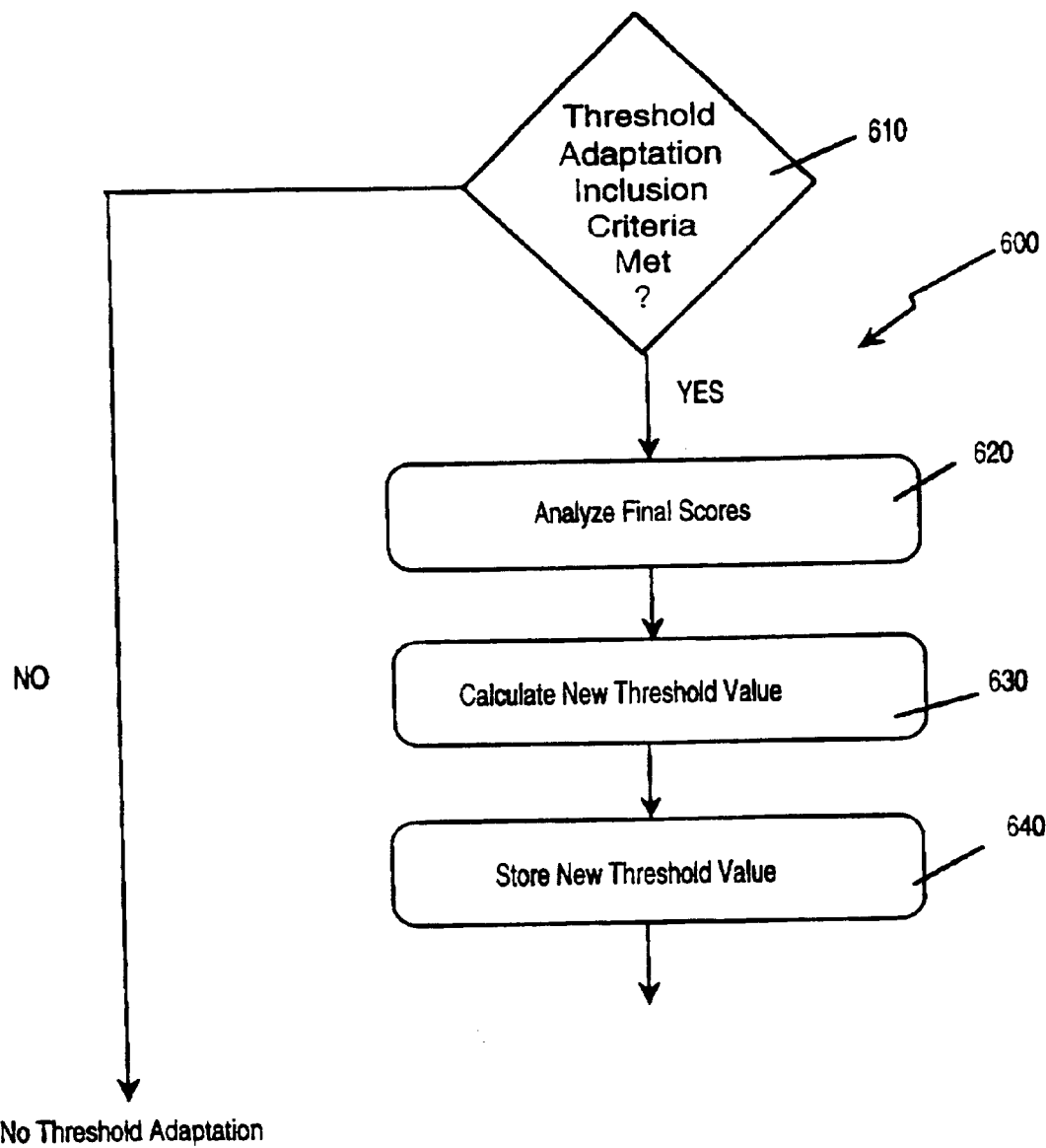
FIG. 9 is a flow diagram of a threshold adaptation module shown in FIG. 2.

Threshold adaptation adapts the threshold value in response to prior final scores. Threshold adaptation module 295 is shown in FIG. 2. FIG. 9 shows an example of threshold adaptation 600. First, the threshold adaptation inclusion criteria are assessed 610. If the inclusion criteria are not met, the process ends and no threshold adaptation takes place. The inclusion criteria may vary depending on the particular application, as described previously with respect to FIG. 8 (fusion adaptation) and FIG. 10 (model adaptation). It is also to be noted that threshold adaptation 600 may affect the amount of false-positive results and the amount of false-negative results. Therefore, the inclusion criteria may be made dependent on the amount of tolerance which is deemed acceptable for these possibilities. Threshold adaptation 600 analyzes one or more prior final scores and adapts the threshold in response to the analysis.

With continued reference to FIG. 9, after assessing the inclusion criteria 610, one or more previous final scores, which may include the present final score, are recalled (if necessary) and analyzed 620. The analysis may be simple or complex. For example, the analysis may be the average or mean of all the successful verifications, or, preferably, the analysis may be the average or mean of one or more unsuccessful verifications in which it is known that false-negative results were obtained.

The new threshold is calculated 630 from this analysis. For example, if the average of four unsuccessful verifications in which it is known that false-negative results were obtained is 0.4, then the new threshold may be set to 0.3.

The analyzation 620 and calculation 630 of a new threshold may depend on the amount of tolerance which is deemed acceptable for false-negative and false-positive results. For example, if false positive results are somewhat tolerable, then the new threshold may be set to the lowest final score in which it is known that a false-negative result occurred.

After calculating the a new threshold, the new threshold is saved 640 for use in current or future testing.

Figure 10:
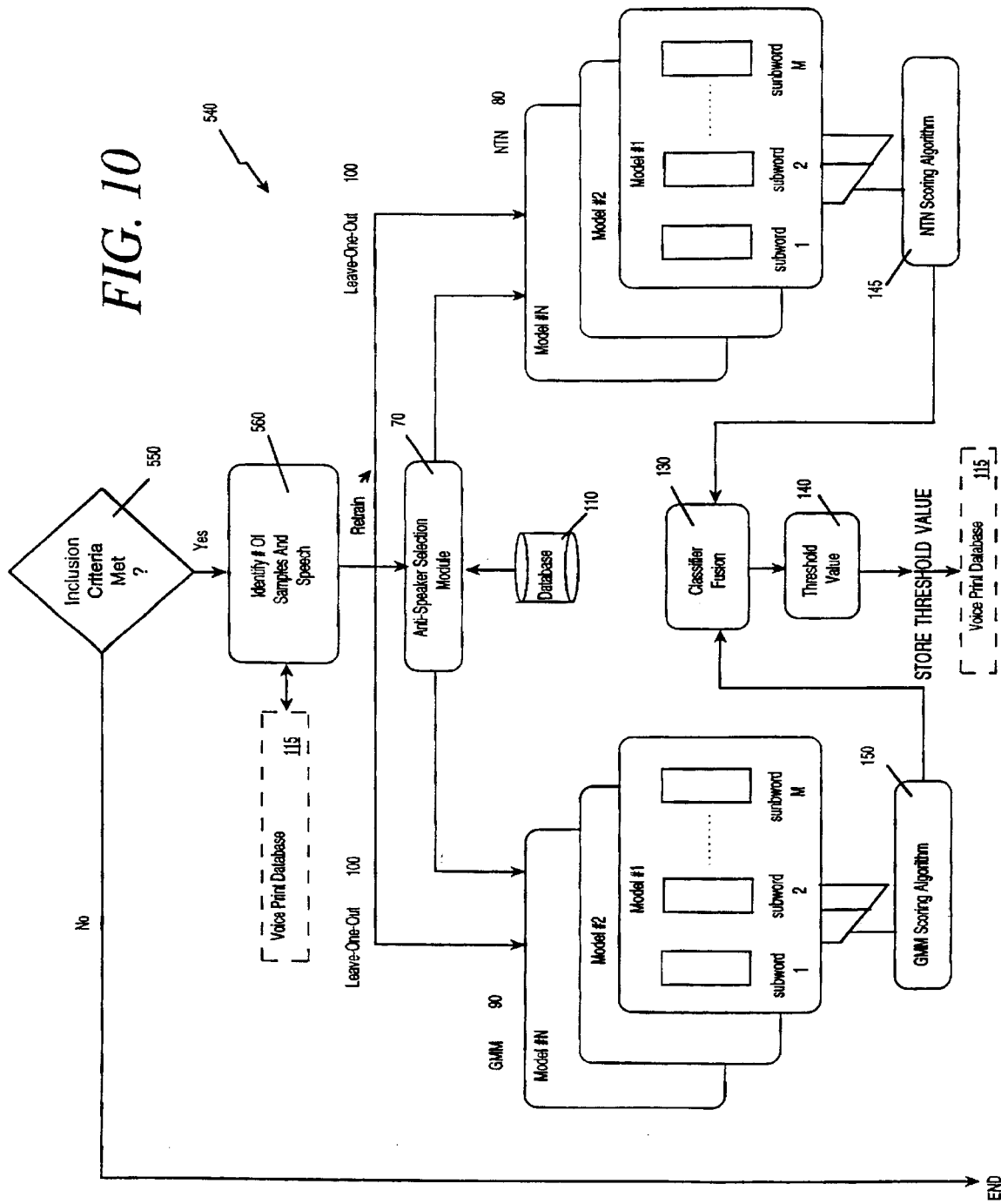
FIG. 10 is a diagram of a model adaptation module used in the system of FIGS. 1 and 2.

Model adaptation adapts the classifier models to subsequent successful verifications. FIG. 10 shows one example of model adaptation 540. First, the inclusion criteria for model adaptation are assessed 550. If the inclusion criteria are not met, the process ends and no model adaptation takes place. The inclusion criteria may vary depending on the particular application, as described previously with respect to FIG. 8 and fusion adaptation. It is also to be noted that model adaptation 540 may effect the amount of false-positive results and the amount of false-negative results because there is a small chance that the successful test speech is a false-positive. Therefore, the inclusion criteria may be made dependent on the amount of tolerance which is deemed acceptable for these possibilities. Model adaptation 540 uses the test speech as enrollment speech, and retrains the classifier models 80, 90, 220 and 230 with the additional data sample (test speech) in a re-enrollment process that is transparent to the user. Therefore, one of the inclusion criteria is that verification is successful for each test speech used in model adaptation.

With continued reference to FIG. 10, after assessing the inclusion criteria 550, the number of samples and their corresponding enrollment speech is identified 560, or recalled from the voice print database 115 if necessary. The previously stored enrollment speech, extracted features, and segmentation (subword) information is recalled from the voice print database 115, along with previous successful test speech, and its associated extracted features.

For example, the previous four test speech samples in which successful verification occurred may be recalled from the voice print database 115, as well as the four initial training samples of enrollment speech. This doubles the number of training samples from four to eight. In order to limit the number of training samples, a "forget" factor may be built into the system, the forget feature may discard one or more samples. For example, only the latest eight samples may be remembered, or only the initial four enrollment speech samples and the newest four successful test samples. The number of samples, and which samples are used, may depend on the tolerance for false-positive results and false-negative results, since the model adaptation will change these probabilities.

After identifying the number of samples and associated speech 560, training the multiple models occur as previously described with respect to FIG. 1A. Therefore the remaining portion of FIG. 10 corresponds to the multiple classifier model and leave-one-out methodology of FIG. 1A. A new threshold value will be obtained by the retrained model. Model adaptation 540, as shown in FIG. 10, operates in conjunction with the classifiers shown in FIGS. 1 and 2.

Model adaptation 540 may also occur as described in copending Provisional Application Serial No. 60/064069, entitled "Model Adaption System And Method For Speaker Verification," filed on Nov. 3, 1997 by Kevin Farrell and William Mistretta.

Model adaptation 540 is useful for adjusting the system to adapt to gradual changes in the user's voice over long periods of time.

Fusion adaptation 290, model adaptation 540, and threshold adaptation 600 all may effect the number and probability of obtaining false-negative and false-positive results, so should be used with caution. These adaptive techniques may be used in combination with channel adaptation 180, or each other, either simultaneously or at different authorization occurrences. Model adaptation is more dramatic than threshold adaptation or fusion adaptation, which both provide incremental changes to the system.

The voiceprint database 115 may or may not be coresident with the antispeaker database 110. Voice print data stored in the voice print database may include: enrollment channel estimate, classifier models, list of antispeakers selected for training, fusion constant, theshold value, normalized segment durations, and/or other intermediate scores or authorization results used for adaptation.

3. "Bootstrapping" Component

Because the enrollment component 10 uses the "closest" antispeaker data to generate the threshold value 140, the antispeaker database 110 must be initially be filled with antispeaker data. The initial antispeaker data may be generated via artificial simulation techniques, or can be obtained from a pre-existing database, or the database may be "bootstrapped" with data by the bootstrapping component.

Figure 11:
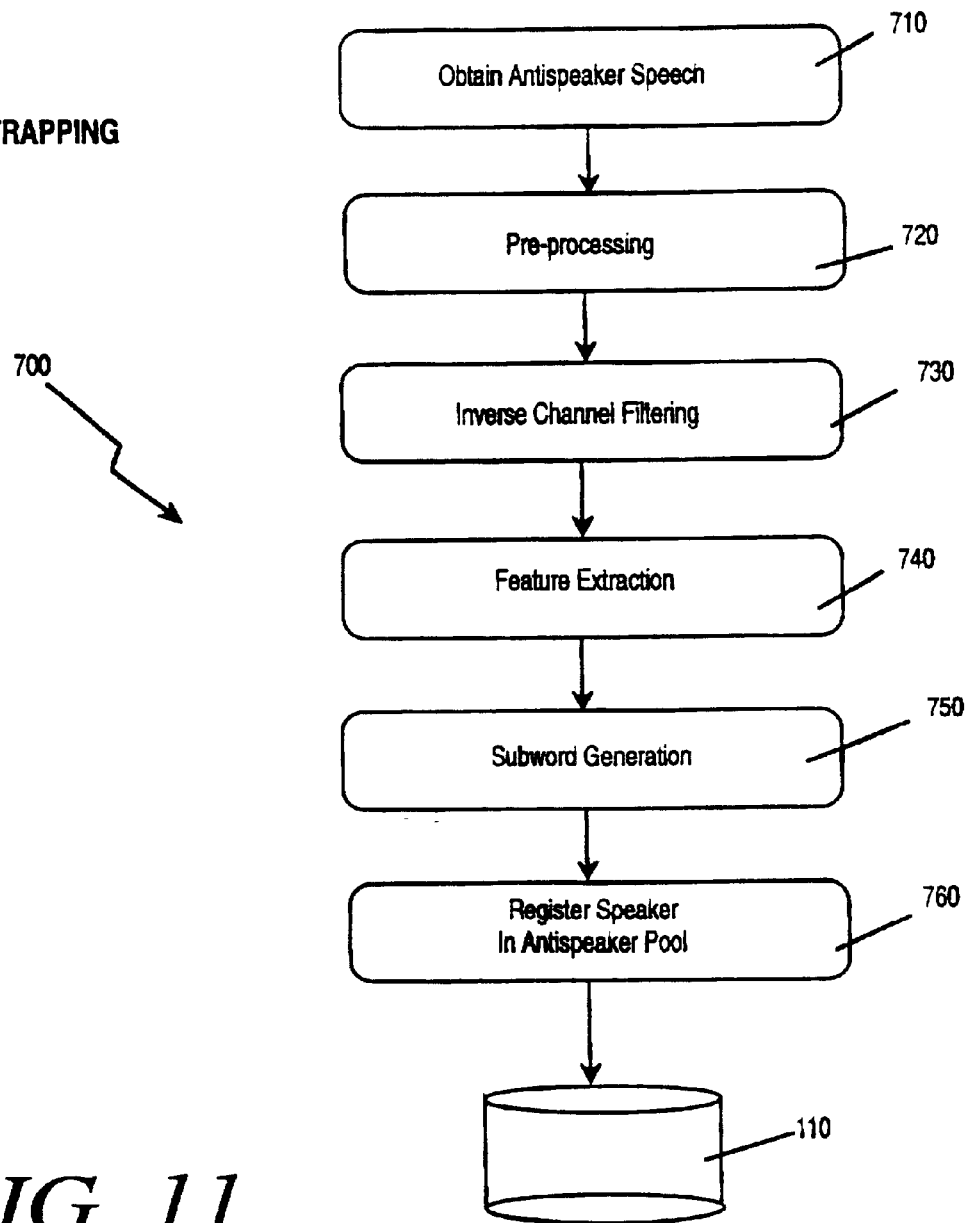
FIG. 11 is a diagram of a bootstrapping component, used to generate antispeaker data in the system of FIG. 1A.

FIG. 11 shows a bootstrapping component 700. The bootstrapping component 700 first obtains antispeaker speech 710, and then preprocess the speech 720 as previously described with respect to FIG. 1A. The antispeaker speech may be phrases from any number of speakers who will not be registered in the database as users. Next, the antispeaker speech is inverse-channel filtered 730 to remove the effects of the antispeaker channel as described with respect to FIGS. 1 and 2. As shown in FIG. 11, the processed and filtered antispeaker speech then undergoes feature extraction 770. The feature extraction may occur as previously described with respect to FIG. 1A. Next, the antispeaker speech undergoes sub-word generation 750, using the techniques previously described with respect to FIG. 1A. The preferable method of sub-word generation is automatic blind speech segmentation, discussed previously with respect to FIG. 1A. The sub-words are then registered as antispeaker data 760 in the database.

Thus, the bootstrapping component initializes the database with antispeaker data which then may be compared to enrollment data in the enrollment component.

The present invention provides for an accurate and reliable automatic speaker verification, which uses adaptive techniques to improve performance. A key word/key phrase spotter 200 and automatic blind speech segmentation improve the usefulness of the system. Adaptation schemes adapt the ASV to changes in success/failures and to changes in the user by using channel adaptation 180, model adaptation 540, fusion adaptation 290, and threshold adaptation 600.

The foregoing description of the present invention has been presented for purposes of illustration and description which is not intended to limit the invention to the specific embodiments described. Consequently, variations and modifications commensurate with the above teachings, and within the skill and knowledge of the relevant art, are part of the scope of the present invention. It is intended that the appended claims be construed to include alternative embodiments to the extent permitted by law.

What is claimed is:

1. An automatic speaker verification system comprising:
   a receiver, the receiver obtaining enrollment speech over an enrollment channel;
   a means, connected to the receiver, for developing an estimate of the enrollment channel;
   a first storage device, connected to the receiver, for storing the enrollment channel estimate;
   a means for extracting predetermined features of the enrollment speech;
   a means, operably connected to the extracting means, for segmenting the predetermined features of the enrollment speech, wherein the features are segmented into a plurality of subwords;
   a plurality of classifiers, connected to the segmenting means, wherein the classifiers model the plurality of subwords and output classifier scores and
   a means, connected to the classifier, for fusing the classifier scores,
   wherein the fusing means weighs the scores from the classifier models with a fusion constant and combines the weighted scores resulting in a final score for the combined system, and
   wherein the weighted scores are variable and are dynamically adapted.

2. An automatic speaker verification method, comprising the steps of:
   obtaining enrollment speech over an enrollment channel;
   storing an estimate of the enrollment channel;
   extracting predetermined features of the enrollment speech;
   segmenting the enrollment speech, wherein the enrollment speech is segmented into a plurality of subwords;
   modeling the plurality of subwords using a plurality of classifier models resulting in an output of classifier scores;
   weighing the scores from the classifier models with a fusion constant, wherein the fusion constant is variable and is dynamically adapted; and
   combining the weighted scores resulting in a final score for the combined system.

3. An automatic speaker verification method, wherein the results of prior verifications are stored, including the steps of:
   obtaining test speech from a user seeking authorization or identification;
   generating subwords of the test speech;
   scoring the subwords against subwords of a known individual using a plurality of modeling classifiers;
   storing the results of each model classifiers as a classifier score;
   fusing the results of each classifier score using a fusion constant and weighing function to generate a final score;
   comparing the final score to a threshold value to determine whether the test speech and enrollment speech are from the known individual;
   determining that fusion adaptation inclusion criteria are met; and
   changing the fusion constant to provide more weight to the classifier score which more accurately corresponds to the threshold value.

4. An automatic speaker verification method, wherein the results of prior verifications are stored, including the steps of:
   obtaining test speech from a user seeking authorization or identification;
   generating subwords of the test speech;
   scoring the subwords against subwords of a known individual using a plurality of modeling classifiers;
   storing the results of each model classifiers as a classifier score;

fusing the results of each classifier score using a fusion constant and weighing function to generate a final score;

comparing final score to a threshold value to determine whether the test speech and enrollment speech are from the known individual;

determining that model adaptation inclusion criteria are met, including that one or more verifications have been successful; and training the model classifiers with previously stored enrollment speech and with speech corresponding to the successful verifications, including the steps of generating a new threshold value; and storing the new threshold value.

5. An automatic speaker verification method, wherein the results of prior verifications are stored, including the steps of:

obtaining test speech from a user seeking authorization or identification;

generating subwords of the test speech;

scoring the subwords against subwords of a known individual using a plurality of modeling classifiers;

storing the results of each model classifiers as a classifier score;

fusing the results of each classifier score using a fusion constant and weighing function to generate a final score;

comparing the final score to a threshold value to determine whether the test speech and enrollment speech are from the known individual;

determining that threshold adaptation inclusion criteria are met;

analyzing the stored final scores;

calculating a new threshold value in response to the analyzation; and storing the new threshold value.

* * * * *